Patented Sept. 1, 1931

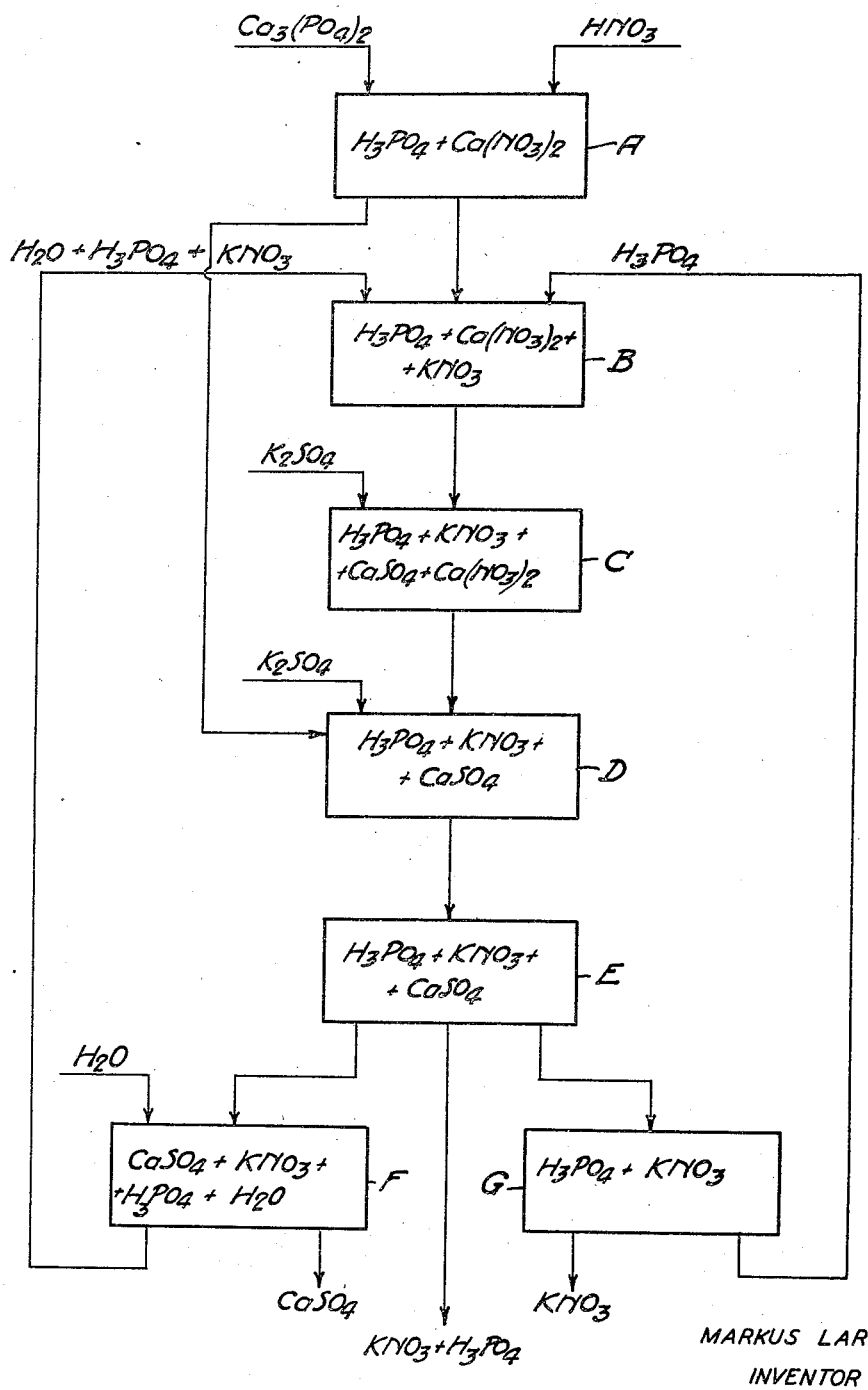

1,821,653

UNITED STATES PATENT OFFICE

MARKUS LARSSON, OF BERLIN, GERMANY, ASSIGNOR TO KUNSTDÜNGER-PATENT-VERWERTUNGS-AKTIENGESELLSCHAFT, OF GLARUS, SWITZERLAND

METHOD OF LEACHING PHOSPHATE ROCK

Application filed February 20, 1930, Serial No. 430,111, and in Sweden March 7, 1929.

It has already been proposed to leach phosphate rock by means of nitric acid while precipitating the lime dissolved as calcium sulphate by means of potassium sulphate, a solution containing a mixture of potassium nitrate and phosphoric acid being thus obtained, which solution then has been treated in some suitable manner for the recovery of products fit for use as fertilizers.

In performing such leaching process great difficulties arise on account thereof that for the calcium sulphate a precipitate of an insoluble double salt containing a high percentage of potassium generally is obtained. Said double salt has been found to be very much stable and is not decomposed in washing the precipitate by means of water and on account thereof its content of potash can be recovered only by the precipitate being treated with rather strongly acid solutions. It is true that it is possible to avoid the formation of said double salt by the reaction being performed in a rather weak solution, but the process will then be ineconomic on account of the extensive evaporating work which will be required for the recovery of the soluble salts in solid state from the weak solution.

This invention relates to a method of performing the above-mentioned leaching process in such manner that a rather concentrated solution of salts can be produced without an insoluble double salt being formed. The invention consists, chiefly, in this that a portion of the finished solution obtained in the process and containing substantially potassium nitrate and phosphoric acid is returned as diluting means in the leaching process after a partial removal of its content of potassium nitrate by cooling and crystallization. Said crystallization is easy to perform in as much as potassium nitrate is rather hardly soluble in cold water as well as in cold weak phosphoric acid. When the finished solution of potassium nitrate and phosphoric acid obtained after a leaching operation is cooled to an adequately low temperature a great part of the potassium nitrate present in the solution crystallizes and can then be separated from the solution in any convenient manner, as for instance by centrifuging. If a sufficient quantity of the remaining solution which substantially consists of weak phosphoric acid and a small percentage of potassium nitrate is returned to the leaching process the reaction products are diluted by said solution in such high degree that the formation of double salts is avoided without any addition of water as diluting means being necessary.

In performing the process the following procedure is, preferably, used, reference being had to the accompanying drawing which shows diagrammatically a flow sheet illustrating the process.

The phosphate rock is first dissolved in nitric acid in a compartment A in such manner that a solution of free phosphoric acid and calcium sulphate is formed. The greater part of the reaction products formed in A are supplied to the mixing compartment B where said products are mixed partly with the greater part of the weak solution which is obtained in the washing of calcium sulphate previously precipitated, partly with a suitable quantity of the strong phosphoric acid solution previously produced, from which potassium nitrate has been removed by crystallization. The reaction products are then transferred to the reaction compartment C to which also potassium sulphate is added either in solid state or mixed with a small quantity of washing liquid. The potassium sulphate reacts according as it is dissolved with the calcium nitrate in the solution to form potassium nitrate and calcium sulphate. The temperature of the solution in such reaction should, preferably, be so high (80° C. or more) that the calcium sulphate formed is precipitated as semihydrate ($CaSO_4 \cdot \frac{1}{2}H_2O$). The potassium sulphate is at this stage of the process used in deficit in relation to the lime content in the solution. The large quantity of phosphoric acid present in the solution reduces the percentage of lime as well as that of the potash in the solution to such extent that the formation of insoluble potassiferous double salts is prevented. The reaction products are then transferred to a compartment D wherein they are cooled, thus causing the semihydrate to recrystallize into dihydrate or gypsum ($CaSO_4.2H_2O$). Said recrystallization may be facilitated by an addition of small gypsum crystals but if the solution is not much concentrated such addition is not necessary. When the recrystallization is finished the remaining portion of the reaction products from the compartment A and potassium sulphate are supplied, the latter being at first used in deficit in relation to the lime content in the solution. When all phosphate rock solution has been added further potassium sulphate is added in such quantity as is required to precipitate the remaining lime in the solution. The calcium sulphate precipitated in the compartment D is deposited as dihydrate or gypsum on the gypsum crystals already present in the solution. The products are then transferred to a reaction compartment E wherein the calcium sulphate is separated from the chief portion of the solution produced and then washed with water in a compartment E for the recovery of adhering solution, the washing liquor being returnd to the compartment B as above described while the gypsum is removed from the process.

The clear solution of phosphoric acid and potassium nitrate separated from the gypsum in the compartment E is to such part as is required for the prosecution of the process transferred to a crystallizing compartment G in which the solution is cooled until potassium nitrate crystallizes. The potassium nitrate crystals are separated from the solution for instance by centrifuging and the remaining strong solution of phosphoric acid is returned to the compartment B as above described.

The crystallized potassium nitrate may be freed from adhering phosphoric acid by washing with cold water and then after drying be used directly as a fertilizer or for other purposes, or it may be added to the portion of the finished limeless solution which is further treated for the production of mixed fertilizers as described herebelow.

The said further treatment of the phosphoric acid solution with its content of potassium nitrate which is not returned to the leaching solution can be performed either in such manner that the solution is neutralized with ammonia for the manufacture of a mixed fertilizer containing mono- or diammonium phosphate and potassium nitrate, or the solution may first be freed from the greater portion of the potassium nitrate dissolved by a strong cooling and the remaining solution consisting essentially of phosphoric acid then be neutralized with ammonia and evaporated to such extent that on the cooling of the concentrated solution ammonium phosphate only but no potassium nitrate crystallizes. The mother liquor separated from the crystallized salt is then returned in the process and may for instance be added to the solution obtained in the leaching after the removal of the precipitated calcium sulphate but before potassium nitrate has been brought to crystallize in the solution.

By crystallizing a greater or less quantity of potassium nitrate it is thus possible to produce either potassium nitrate and ammonium phosphate separately or pure potassium nitrate and a mixed fertilizer in which the ratio between potassium nitrate and ammonium phosphate may be varied at will within very wide limits.

The invention is not limited to a process in which the phosphate rock is first dissolved in nitric acid and then an addition of circulating solution and potassium sulphate is made, but the order of these operations may be varied. For instance, the nitric acid may first be used to dissolve potassium sulphate with or without dilution with circulating solution whereupon the phosphate rock is added in a dry state or in mixture with a part of the circulating solution. It is further not necessary to perform the precipitation of the calcium sulphate at such high temperature that semihydrate is formed but the calcium sulphate may be precipitated directly as dihydrate. In the latter case gypsum crystals of a proper size should, however, be added in a suitable quantity to the reaction mixture as otherwise the gypsum will not be precipitated with such crystal form that it can be easily separated from the solution.

It is important for the producing of a gypsum having a proper crystal form that ammonium salt is present during the reaction. By an addition of a small quantity of ammonia, for instance to the circulating solution, ammonium phosphate is formed therein which latter facilitates the formation of easily removable gypsum crystals.

*Example.*—1.5 kgs. of Morocco phosphate were dissolved in 3.38 kgs. of a 50% nitric acid whereby a solution containing substantially phosphoric acid and calcium nitrate (solution No. 1) was obtained. 4.5 kgs. of a solution containing substantially 18.5% of $KNO_3$ and 14.4% of $H_3PO_4$ and obtained from a finished solution produced in a preceding operation by the crystallization of a part of its content of potassium nitrate by the cooling of the solution, were mixed with 3.45 kgs. of washing liquid obtained in the washing of the gypsum precipitated in a preceding operation and likewise containing substantially phosphoric acid and potassium nitrate, whereby 7.95 kgs. of a solution of phosphoric acid and potassium nitrate were obtained (solution No. 2). 5.95 kgs. of solution No. 2 was to a fourth neutralized with ammonia and was then mixed with 3.4 kgs. of solution No. 1, whereby a solution No. 3 containing phosphoric acid, calcium nitrate, potassium nitrate and a small percentage of ammonium phosphate was obtained. The remaining 2 kgs. of solution No. 2 were mixed with 2.3 kgs. of potassium sulphate and 2.4 kgs. of this mixture were added to solution No. 3, the temperature being at this stage maintained at about 95° C. A reaction between the calcium nitrate and the potassium sulphate to potassium nitrate and calcium sulphate now occurred, the latter being precipitated as semihydrate. In said reaction the potassium sulphate was present in deficit in relation to the total quantity of lime in the solution. The reaction solution was then cooled to about 60° C. and after 3 hours the precipitated semihydrate had recrystallized to gypsum. Then the remainder of the solution No. 1 together with a part of the remaining mixture containing potassium sulphate was added, it being observed that the potassium sulphate still was used in deficit, and finally the remainder of the potassium sulphate solution was added, the potash added being now sufficient to precipitate as gypsum all lime still present in the solution. When the gypsum had deposited, the finished clear and rather concentrated solution containing potassium nitrate and phosphoric acid together with a small percentage of ammonium phosphate was separated by decantation.

What I claim is:—

1. Method of treating phosphate rock, which comprises dissolving the phosphate rock in nitric acid, adding phosphoric acid solution to the reaction products, precipitating the lime dissolved as calcium sulphate by means of potassium sulphate, separating the insoluble matters from the solution of phosphoric acid and potassium nitrate produced, removing potassium nitrate from said solution, and using a part of the remaining phosphoric acid solution as addition to the reaction products of phosphate rock and nitric acid in continuing the process.

2. Method of treating phosphate rock, which comprises dissolving the phosphate rock in nitric acid, adding wash liquor obtained in the process as well as strong phosphoric acid solution to the reaction products, precipitating the lime dissolved as calcium sulphate, by means of potassium sulphate, separating the insoluble matters from the solution of phosphoric acid and potassium nitrate produced, removing the potassium nitrate from said solution, and using a part of the remaining phosphoric acid solution as addition to the reaction products of phosphate rock and nitric acid in continuing the process.

3. Method of treating phosphate rock, which comprises dissolving the phosphate rock in nitric acid, adding strong phosphoric acid solution to the reaction products, precipitating the lime dissolved by a stepwise addition of potassium sulphate, separating the insoluble matters from the solution produced, removing potassium nitrate from acid solution by crystallization, and using a part of the remaining phosphoric acid solution as addition to the reaction products of phosphate rock and nitrate acid in continuing the process.

4. Method of treating phosphate rock, which comprises dissolving the phosphate rock in nitric acid, adding phosphoric acid solution to the reaction products, precipitating a part of the lime dissolved by means of potassium sulphate while keeping the temperature sufficiently high to produce calcium sulphate semihydrate, recrystallizing said semihydrate to dihydrate by cooling, then adding more potassium sulphate to precipitate the remaining lime content of the solution, separating the insoluble matters from the solution, removing potassium nitrate from said solution, and using a part of the remaining solution as addition to the reaction products of phosphate rock and nitric acid in continuing the process.

5. Method of treating phosphate rock, which comprises producing a phosphoric acid solution with a low percentage of calcium nitrate by dissolving phosphate rock in nitric acid and adding large quantities of phosphoric acid to the reaction products, precipitating the lime dissolved by means of potassium sulphate in presence of an ammonium salt, separating the insoluble matters from the solution produced, removing potassium nitrate from said solution by crystallization, and using a part of the remaining solution together with ammonia as addition to the products obtained in dissolving the phosphate rock in continuing the process.

6. Method of treating phosphate rock, which consists in dissolving the phosphate rock in nitric acid, precipitating part of the lime dissolved by means of potassium sulphate while using a temperature sufficiently high to produce calcium sulphate semihydrate, recrystallizing said semihydrate to dihydrate, then adding more potassium sulphate to precipitate the remaining lime content in the solution, separating the solution from the precipitate, removing potassium nitrate from the solution, and using a part of the remaining solution as diluting means for the products obtained in dissolving the phosphate rock.

In testimony whereof I have signed my name.

MARKUS LARSSON.